United States Patent
Hong et al.

(10) Patent No.: US 10,511,758 B2
(45) Date of Patent: Dec. 17, 2019

(54) IMAGE CAPTURING APPARATUS WITH AUTOFOCUS AND METHOD OF OPERATING THE SAME

(71) Applicant: SAMSUNG ELECTRONICS CO., LTD., Suwon-si, Gyeonggi-do (KR)

(72) Inventors: Hyun-seok Hong, Suwon-si (KR); Sahng-gyu Park, Seongnam-si (KR); Yeong-rok Lee, Suwon-si (KR); Jin-gu Jeong, Seongnam-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/142,203

(22) Filed: Apr. 29, 2016

(65) Prior Publication Data

US 2017/0026565 A1    Jan. 26, 2017

(30) Foreign Application Priority Data

Jul. 20, 2015 (KR) .................. 10-2015-0102408

(51) Int. Cl.
*H04N 5/232* (2006.01)
*G06K 9/00* (2006.01)
(Continued)

(52) U.S. Cl.
CPC ......... *H04N 5/23212* (2013.01); *G06F 3/013* (2013.01); *G06F 3/0488* (2013.01);
(Continued)

(58) Field of Classification Search
CPC ........... H04N 5/23212; H04N 5/23216; H04N 5/23219; H04N 5/23293; G06F 3/013;
(Continued)

(56) References Cited

U.S. PATENT DOCUMENTS

| 7,206,022 B2* | 4/2007 | Miller ............... G02B 27/0093 348/231.3 |
| 8,767,082 B2* | 7/2014 | Thorn .................... G02B 7/287 348/222.1 |

(Continued)

FOREIGN PATENT DOCUMENTS

| EP | 2 608 524 | 6/2013 |
| JP | 2007-074141 | 3/2007 |

(Continued)

OTHER PUBLICATIONS

Search Report and Written Opinion dated Sep. 26, 2016 in counterpart International Patent Application No. PCT/KR2016/004493.

(Continued)

*Primary Examiner* — Ngoc Yen T Vu

(74) *Attorney, Agent, or Firm* — Nixon & Vanderhye, P.C.

(57) ABSTRACT

An image capturing apparatus including: a display unit comprising a display panel, the display unit configured to display an image including at least one subject; a detection unit comprising detection circuitry, the detection unit configured to detect an input for setting a region of interest in the image; and a controller configured to detect at least one candidate region from the region of interest set based on the input, and set one of the at least one detected candidate region as an auto-focus (AF) region based on priorities of the at least one detected candidate region.

20 Claims, 15 Drawing Sheets

(51) Int. Cl.
*G06F 3/0488* (2013.01)
*G06F 3/01* (2006.01)

(52) U.S. Cl.
CPC ..... *G06K 9/00228* (2013.01); *G06K 9/00362* (2013.01); *H04N 5/23293* (2013.01); *H04N 5/23216* (2013.01); *H04N 5/23219* (2013.01)

(58) Field of Classification Search
CPC ... G06F 3/048; G06F 3/0488; G06K 9/00362; G06K 9/00221; G06K 9/00295; G06K 2009/00328
USPC ................. 348/333.01–333.03, 345
See application file for complete search history.

(56) References Cited

U.S. PATENT DOCUMENTS

| | | | |
|---|---|---|---|
| 9,423,994 B2* | 8/2016 | Suresh | G09G 5/14 |
| 9,888,168 B2* | 2/2018 | Chun | H04N 5/23216 |
| 2008/0199056 A1 | 8/2008 | Tokuse | |
| 2009/0015703 A1 | 1/2009 | Kim et al. | |
| 2010/0045800 A1* | 2/2010 | Chebil | G03B 13/36 |
| | | | 348/169 |
| 2010/0165114 A1 | 7/2010 | Goh | |
| 2012/0133891 A1 | 5/2012 | Jiang | |
| 2013/0155276 A1* | 6/2013 | Ueda | G02B 7/36 |
| | | | 348/223.1 |
| 2014/0049462 A1* | 2/2014 | Weinberger | G06F 3/013 |
| | | | 345/156 |
| 2014/0049611 A1* | 2/2014 | Woo | H04N 5/23229 |
| | | | 348/46 |
| 2014/0226858 A1 | 8/2014 | Kang et al. | |
| 2014/0293086 A1 | 10/2014 | Ugawa | |
| 2014/0354874 A1 | 12/2014 | Lee | |
| 2014/0361984 A1* | 12/2014 | Kim | G06F 3/013 |
| | | | 345/156 |
| 2015/0002394 A1 | 1/2015 | Cho et al. | |
| 2015/0003819 A1 | 1/2015 | Ackerman et al. | |
| 2015/0016693 A1* | 1/2015 | Gattuso | H04N 5/23219 |
| | | | 382/118 |

FOREIGN PATENT DOCUMENTS

| | | |
|---|---|---|
| KR | 2009-0006454 | 1/2009 |
| KR | 2015-0025268 | 3/2009 |
| KR | 10-2012-0068655 | 6/2012 |
| WO | 2007/077283 | 7/2007 |

OTHER PUBLICATIONS

Extended European Search Report dated May 22, 2018 for European Patent Application No. 16827919.8.

* cited by examiner

IMAGE CAPTURING APPARATUS WITH AUTOFOCUS AND METHOD OF OPERATING THE SAME

CROSS-REFERENCE TO RELATED APPLICATION

This application is based on and claims priority under 35 U.S.C. § 119 to Korean Patent Application No. 10-2015-0102408, filed on Jul. 20, 2015, in the Korean Intellectual Property Office, the disclosure of which is incorporated by reference herein in its entirety.

BACKGROUND

1. Field

The present disclosure relates to image capturing apparatuses and methods of operating the image capturing apparatuses, and for example, to image capturing apparatuses capable of accurately performing auto-focusing on a region desired by a user and methods of operating the image capturing apparatuses.

2. Description of Related Art

An image capturing apparatus or an electronic device including a camera typically includes an auto-focus (AF) function. The AF function may include, for example, selection AF in which a region designated by a user is set as an AF region, face detection AF in which a face region is detected and set as an AF region, or the like.

However, in the case of selection AF, if a user does not accurately designate a particular region to be set as a focus region or if an image capturing apparatus does not accurately recognize a region designated by a user, a wrong AF region may be set.

SUMMARY

Image capturing apparatuses for accurately performing auto-focusing on a region desired by a user by detecting a region of a face or an object within a region of a predetermined range set based on a received input, e.g., a user input, and setting one of detected regions as an auto-focus (AF) region, and methods of operating the image capturing apparatuses are provided.

Additional aspects will be set forth in part in the description which follows and, in part, will be apparent from the description.

According to an aspect of an example embodiment, an image capturing apparatus includes: a display unit including a display panel, the display unit configured to display an image including at least one subject; a detection unit including detection circuitry configured to detect an input for setting a region of interest in the image; and a controller configured to detect at least one candidate region from the region of interest set based on the input, and to set one of the at least one detected candidate region as an auto-focus (AF) region based on priorities of the at least one detected candidate region.

The detection unit may be configured to track a gaze of a user looking at the display unit, and the controller may be configured to set the region of interest based on a point on the display unit that is intersected by the tracked gaze of the user.

The detection unit may detect a touch input of touching the display unit, and the controller may be configured to set the region of interest with respect to a touched point on the display unit.

The controller may be configured to set at least one of a size and a shape of the region of interest based on an input for setting at least one of the size and the shape of the region of interest.

The controller may be configured to detect, from the region of interest, a region including one or more of a face of a person, a face of an animal, an object that is not a person or an animal, a line, and a point, as a candidate region.

When one candidate region is detected from the region of interest, the controller may be configured to set the one candidate region as the AF region.

When two or more candidate regions are detected from the region of interest, the controller may be configured to set a candidate region having a highest priority from among the detected candidate regions as the AF region.

The detection unit may detect an input of moving a gaze while the AF region is set, and the controller may be configured to reset a candidate region located in a direction in which the gaze is moved with respect to the set AF region, as a new AF region.

The display unit may display the at least one detected candidate region, and the controller may be configured to set one of the at least one detected candidate region selected based on an input of selecting the one of the at least one detected candidate region.

The display unit may display the set AF region.

The image capturing apparatus may further include an image capturing unit including image capturing circuitry, the image capturing unit configured to perform image capturing by focusing on the set AF region.

According to an aspect of another example embodiment, a method of operating an image capturing apparatus, includes: displaying an image including at least one subject; setting a region of interest by detecting an input for setting a region of interest in the image; detecting at least one candidate region from the set region of interest; and setting one of the at least one detected candidate region as an auto-focus (AF) region based on priorities of the at least one detected candidate region.

The setting of the region of interest by detecting the input may include tracking a gaze of a user looking at the display unit, and setting the region of interest with respect to a point on the display unit that is intersected by the tracked gaze.

The setting of the region of interest by detecting the input may include detecting a touch input of touching the display unit and setting the region of interest with respect to a touched point on the display unit.

The method may further include setting at least one of a size and a shape of the region of interest based on an input for setting at least one of the size and the shape of the region of interest.

The detecting, from the set region of interest, at least one candidate region may include detecting, from the set region of interest, a region including one or more of a face of a person, a face of an animal, an object that is not a person or an animal, a line, and a point as a candidate region.

The setting of one of the at least one detected candidate region as an AF region may include, when one candidate region is detected from the region of interest, setting the one candidate region as the AF region.

The setting of one of the at least one detected candidate region as an AF region may include, when two or more candidate regions are detected from the region of interest, setting a candidate region having a highest priority from among the detected candidate regions, as the AF region.

The method may further include: detecting an input of moving a gaze while the AF region is set; and resetting a candidate region located in a direction in which the gaze is moved with respect to the set AF region, as a new AF region.

The method may further include: displaying the at least one detected candidate region; and detecting an input of selecting one of the at least one detected candidate region, wherein the setting of one of the at least one detected candidate region as an AF region includes setting the selected candidate region as the AF region.

The method may further include displaying the set AF region.

The method may further include performing image capturing by focusing on the set AF region.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
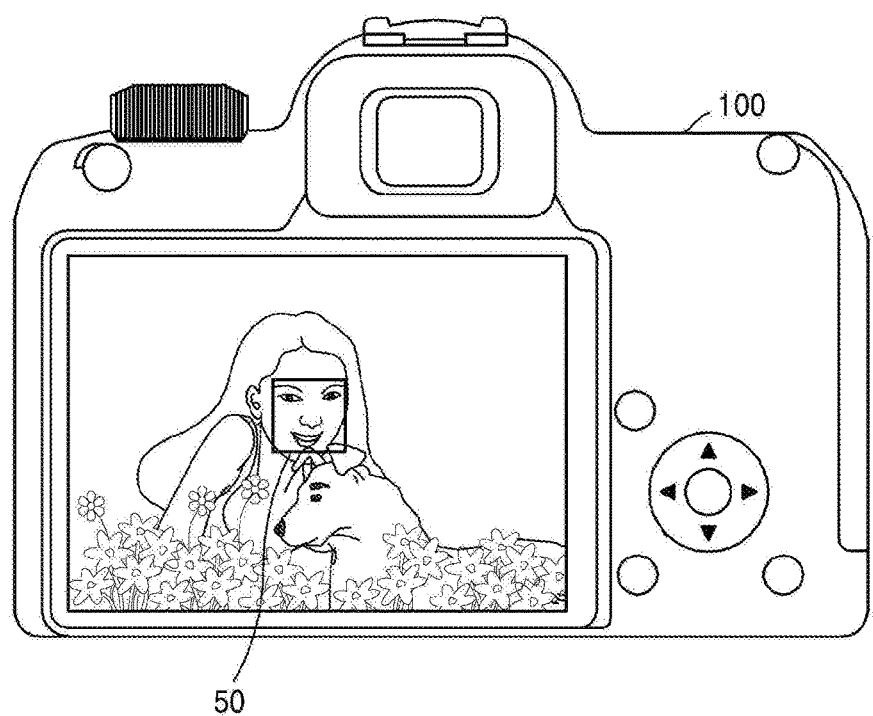
FIG. 1 is a diagram illustrating an example image capturing apparatus.

Reference will now be made in greater detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are described below, simply by referring to the figures, to explain aspects of the present disclosure.

The terms used in the present disclosure will be described briefly and example embodiments will then be described in greater detail.

The terms used in the present disclosure are those general terms currently widely used in the art in consideration of functions in regard to the disclosure, but the terms may vary according to the intention of those of ordinary skill in the art, precedents, or new technology in the art. Also, specified terms may be arbitrarily selected, and in this case, the detailed meaning thereof will be described in the detailed description. Thus, the terms used in the present disclosure should be understood not as simple names but based on the meaning of the terms and the overall description of the disclosure.

Throughout the disclosure, it will be understood when a part "includes" an element, unless there is a particular description contrary thereto, the part can further include other elements, not excluding the elements. Also, the terms "unit" and "module" used herein represent a unit for processing at least one function or operation, which may be implemented by hardware (e.g., circuitry), firmware, software, or a combination of hardware and software.

The example embodiments will be described with reference to the accompanying drawings in such a manner that the example embodiments may be easily understood by a person of ordinary skill in the art. However, the disclosure may be implemented in various forms and is not limited to the example embodiments. In addition, descriptions of well-known functions and constructions may be omitted for clarity and conciseness, and similar reference numerals are assigned to similar elements throughout the disclosure. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an example image capturing apparatus 100.

Referring to FIG. 1, the image display apparatus 100 may be implemented in various forms such as a digital still camera capturing a still image or a digital video camera capturing video images, or the like. In addition, the image capturing apparatus 100 may include a digital single lens reflex (DSLR) camera, a mirrorless camera, or the like. Furthermore, the image capturing apparatus 100 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG-1 Audio Layer-3 (MP3) player, a mobile medical device, and a wearable device, or the like. The image display apparatus 100 is not limited to the above-described devices, and may include an electronic apparatus including a camera module that includes a lens and an image capturing device to capture an image of a subject.

The image capturing apparatus 100 according to an example embodiment may include an auto-focus (AF) function. An AF function is a function to automatically adjust a focus on a subject. The image capturing apparatus 100 may provide various AF modes. Examples of AF modes provided by the image capturing apparatus 100 may include, for example, a Single Auto Focus (SAF) mode, a Continuous Auto focus (CAF) mode, a Multi Auto Focus (MAF) mode, and a Manual Focus (MF) mode.

In addition, the image capturing apparatus 100 may include, for example, a touch AF mode or a gaze tracking AF mode. In the touch AF mode, when a user touches a point the user desires to be focused, for example, by using his or her finger or a stylus pen, or the like, then focusing is performed based on the touched point. In the gaze tracking AF mode, when a user looks at a point the user desires to be focused, focusing is performed based on the point at which the user is looking. However, AF modes of the image capturing apparatus 100 are not limited thereto.

The image capturing apparatus 100 according to an example embodiment may set a region of interest having a predetermined size and shape based on a user input (e.g., a touch input of touching a point the user desires to be focused, a gaze input of gazing at a point the user desires to be focused, or the like). The image capturing apparatus 100 may detect predetermined regions from a set region of interest (e.g., regions including at least one of a face of a person, a face of an animal, an object that is not a person or an animal, a line (or characteristics of a line), and a point (or characteristics of a point)). The image capturing apparatus 100 may set one of detected predetermined regions as an AF region and perform image capturing by focusing on the AF region.

Also, the image capturing apparatus 100 may display an AF region 50 on a display unit as illustrated in FIG. 1.

Figure 2:
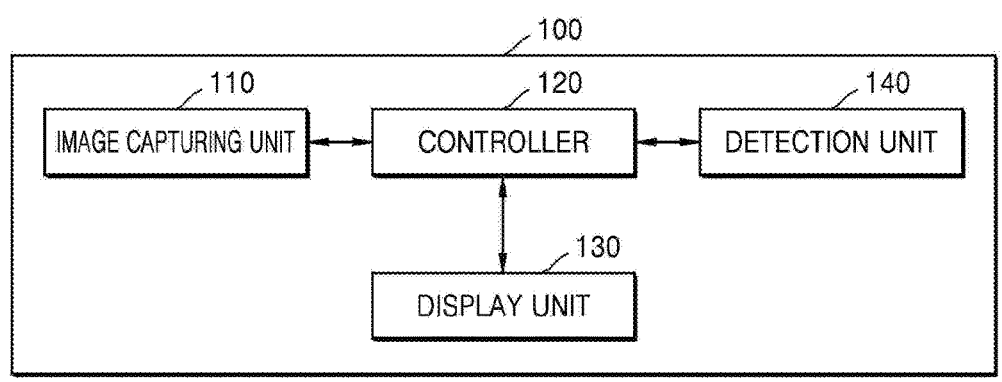
FIG. 2 is a block diagram illustrating an example structure of an image capturing apparatus.

FIG. 2 is a block diagram illustrating an example structure of an image capturing apparatus 100.

Referring to FIG. 2, the image capturing apparatus 100 may include a detection unit (e.g., including detection circuitry) 140, an image capturing unit (e.g., including image capturing circuitry) 110, a controller (e.g., including processing circuitry) 120, and a display unit (e.g., including a display panel and display driving circuitry) 130.

The detection unit 140 according to an example embodiment may detect an input, e.g., a user input, for setting a region of interest. The detection unit 140 may detect a gaze input or a touch input of a user. For example, the detection unit 140 may include a camera that is used to track a user's gaze. The camera for tracking a user's gaze may capture an image of the eyes of the user and a gaze of the user may be tracked based on the image of the eyes of the user. Accordingly, the image capturing apparatus 100 may detect a point at which a user is gazing (e.g., a point where the user's gaze is maintained) in an image displayed on the display unit 130 (e.g., a view finder image or a live view image).

Also, the detection unit 140 may include a touch screen. The touch screen may display a live view image to a user so that the user may check a composition of a subject whose image is to be captured and an image capturing condition thereof. When the user touches a point the user desires to be focused, by using a touch instrument such as, for example, a finger or a stylus pen while viewing the touch screen, the detection unit 140 may detect the touched point.

The controller 120 may be configured to control an overall operation of the image capturing apparatus 100. The controller 120 may be configured to provide control signals to the elements of the image capturing apparatus 100 so as to control the elements of the image capturing apparatus 100.

The controller 120 according to an example embodiment may be configured to set a region of interest based on an input detected by the detection unit 140. For example, the controller 120 may be configured to set a region of interest having a preset shape and size with respect to a point at which the user is gazing. The controller 120 may be configured to set a region of interest having a preset shape and size with respect to a point touched by the user.

Also, when a region of interest is set, the controller 120 may be configured to detect at least one candidate region from the set region of interest. For example, the controller 120 may be configured to detect, from a region of interest, regions that include one or more of a face of a person, a face of an animal, an object that is not a face of a person or a face of an animal, a line (or characteristics of a line), a point (or characteristics of a point), or the like, as candidate regions.

The controller 120 may be configured to set one of the detected candidate regions as an AF region. For example, when one candidate region is included in a region of interest, the controller 120 may be configured to set the candidate region as an AF region. When two or more candidate regions are included in a region of interest, the controller 120 may be configured to set a candidate region having a highest priority as an AF region, based on priorities of the candidate regions. For example, a priority of a candidate region may be determined based on a type of an object included in the candidate region. For example, a priority of a candidate region including a face of a person may be higher than a priority of a candidate region including a face of an animal. A priority of a candidate region including a face of an animal may be higher than a priority of a candidate region including an object that is not a face of a person or a face of an animal. However, the example embodiments are not limited thereto, and priorities of candidate regions may be set, for example, based on a user input.

The display unit 130 may display an operating state of the image capturing apparatus 100 or information of images captured by using the image capturing apparatus 100. The display unit 130 may include, for example, a liquid crystal display (LCD), a light-emitting diode (LED) display, an organic light-emitting diode (OLED) display, a microelectromechanical systems (MEMS) display, an electronic paper display, or the like. However, the display unit 130 is not limited thereto.

The display unit 130 according to an example embodiment may include a touch screen. Also, the display unit 130 may display a live view image to a user so that the user may check a composition and an image capturing condition of a subject whose image is to be captured. Also, the display unit 130 may display a set AF region.

The image capturing unit 110 is an element generating an image of an electrical signal from incident light, and may include a focus lens and a lens driver driving the focus lens. The focus lens is used to adjust a focusing point of an image, and may be moved to reduce or increase a focal length so as to adjust a focus on a set AF region. The focus lens may be moved by being driven by the lens driver. The lens driver may include various types of motors such as a stepping motor or a piezo motor.

In addition, the image capturing unit 110 may include an image sensor. The image sensor receives light that is incident through a lens to generate an image.

Figure 3:
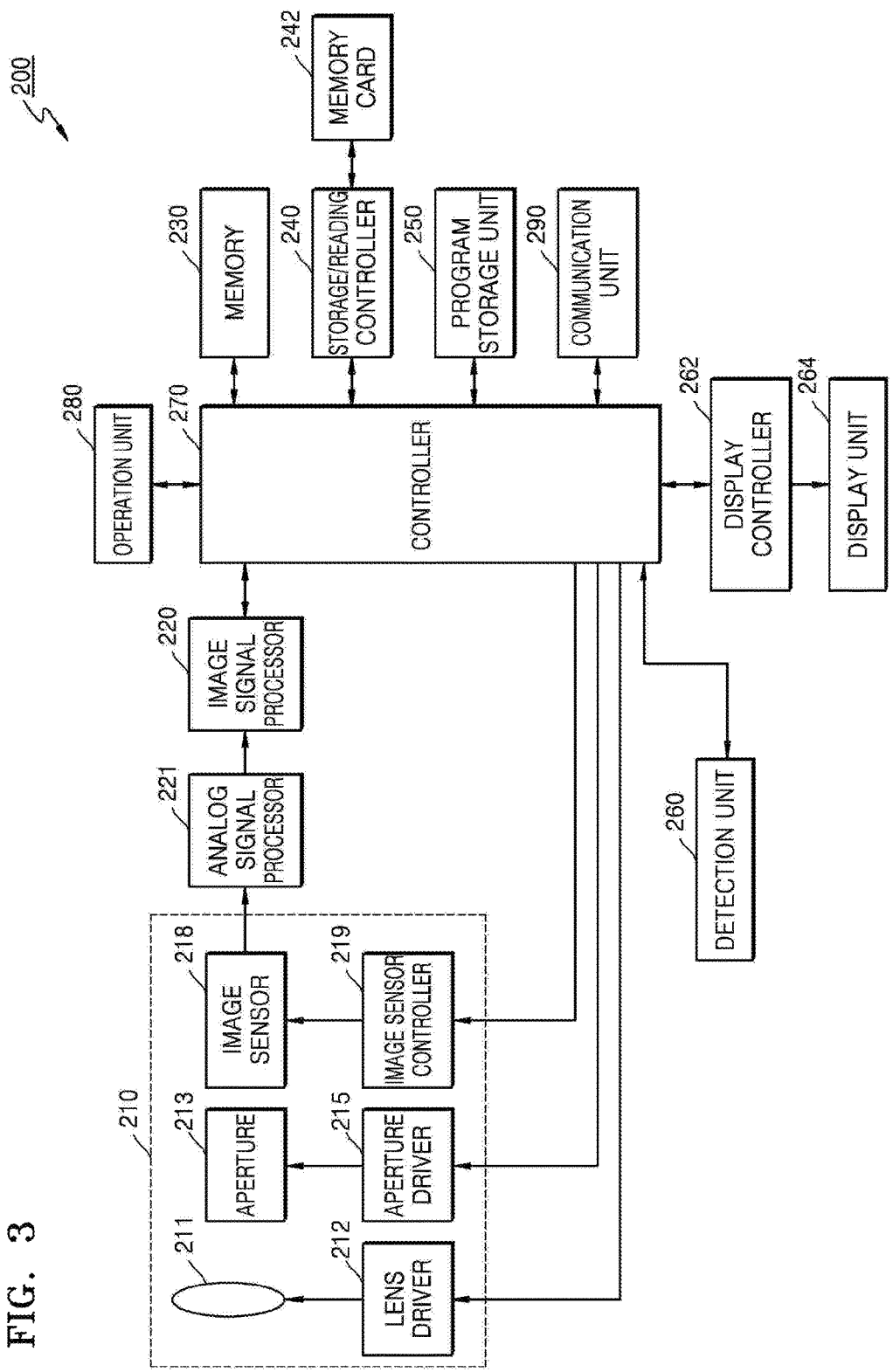
FIG. 3 is a block diagram illustrating an example structure of an image capturing apparatus.

FIG. 3 is a block diagram illustrating an example structure of an image capturing apparatus 200.

Referring to FIG. 3, the image capturing apparatus 200 may include a detection unit (e.g., including detection circuitry) 260, a controller (e.g., including processing circuitry) 270, a display unit (e.g., including a display panel) 264, an image capturing unit (e.g., including image capturing circuitry) 210, and may further include an analog-to-digital signal processor (e.g., including processing circuitry) 221, an image signal processor (e.g., including processing circuitry) 220, a memory 230, a storage/reading controller 240, a memory card 242, a program storage unit (e.g., including a memory) 250, a communication unit (e.g., including communication circuitry) 290, an operation unit (e.g., including input circuitry) 280, and a display driver (e.g., including display driving circuitry) 262.

The detection unit 260 of FIG. 3 corresponds to the detection unit 140 of FIG. 2, the controller 270 of FIG. 3 corresponds to the controller 120 of FIG. 2, the display unit 264 of FIG. 3 corresponds to the display unit 130 of FIG. 2, and the image capturing unit 210 of FIG. 3 corresponds to the image capturing unit 110 of FIG. 2, and thus repeated descriptions will be omitted.

Referring to FIG. 3, the image capturing unit 210 is an element for generating an image from incident light, and providing the image as an electrical signal, and includes a lens 211, a lens driver 212, an aperture 213, an aperture driver 215, an image sensor 218, and an image sensor controller 219.

The lens 211 may include a plurality of lens groups each having a plurality of lenses. A location of the lens 211 may be adjusted using the lens driver 212. The lens driver 212 may adjust the location of the lens 211 based on a control signal provided by the controller 270. The lens driver 212 may adjust a focal length by adjusting the location of the lens 211 and may also perform auto-focusing, zoom adjustment, focus adjustment, or the like.

The aperture driver 215 may adjust a degree of opening of the aperture 213 so as to adjust an amount of light incident on the image sensor 218.

An optical signal, which has passed through the lens 211 and the aperture 213, may form an image of a subject on a light-receiving surface of the image sensor 218.

The image sensor 218 may be a charge-coupled device (CCD) image sensor or a complementary metal-oxide semiconductor image sensor (CIS), or the like, configured to convert an optical signal into an electrical signal. The image sensor controller 219 may adjust the sensitivity or the like of the image sensor 218. The image sensor controller 219 may be configured to control the image sensor 218 based on a control signal. The control signal may be automatically generated by an image signal that is input in real time or may be manually input, for example by a user operation.

The analog signal processor 221 may perform noise reduction, gain control, waveform shaping, and analog-to-digital conversion (ADC) on an analog signal provided from the image sensor 218.

The image signal processor 220 may perform a specific function on an image data signal obtained by processing the analog signal in the analog signal processor 221. For example, for image quality enhancement and special effects, the image signal processor 220 may perform image signal processing, such as noise reduction, gamma correction, color filter array interpolation, color matrix, color correction, and color enhancement, white balancing, luminance smoothing, and color shading, with respect to the input image data signal. The image signal processor 220 may compress the input image data into an image file, or may reconstruct the image data from the image file. An image compression format may be reversible or irreversible. For example, a still image may be compressed into a Joint Photographic Experts Group (JPEG) format or a JPEG 2000 format. In the case of recording a video, a plurality of frames may be compressed into a video file in accordance with the Moving Picture Experts Group (MPEG) standard. For example, an image file may be generated in accordance with the exchangeable image file format (Exif) standard.

The image signal processor 220 may generate a video file from an imaging signal generated by the image sensor 218. The imaging signal may be a signal that is generated by the image sensor 218 and is then processed by the analog signal processor 221. The image signal processor 220 may generate frames to be included in a video file from an imaging signal, code the frames in accordance with an appropriate standard, for example, MPEG4, H.264/AVC, or windows media video (WMV) to compress a video, and generate a video file by using the compressed video. The video file may be generated in various formats, such as mpg, mp4, 3gpp, avi, asf, or mov. The image signal processor 220 may output a generated first image to the controller 270.

The image data output from the image signal processor 220 is input to the storage/reading controller 240 via the memory 230 or directly thereto, and the storage/reading controller 240 stores the image data in the memory card 242 based on a signal from the user or automatically. Also, the storage/reading controller 240 may read data about an image from an image file stored in the memory card 242 and input the data to a display driver via the memory 230 or other paths so that an image is displayed on the display unit 264. The memory card 242 may be detachable or may be permanently mounted in the image capturing apparatus 200. For example, the memory card 242 may be a flash memory card such as a Secure Digital (SD) card, or the like.

In addition, the image signal processor 220 may perform sharpness processing, chromatic processing, blurring processing, edge emphasis processing, image interpretation processing, image recognition processing, image effect processing, and the like on the input image data. The image recognition processing may include face recognition processing and scene recognition processing. The image signal processor 220 may perform image signal processing so as to display image data on a display unit. For example, the image signal processor 220 may perform luminance level adjustment, color correction, contrast adjustment, contour emphasis adjustment, screen splitting, character image generation, and image synthesis.

Meanwhile, a signal processed by the image signal processor 220 may be input directly to the controller 270 or via the memory 230. The memory 230 operates as a main memory of the image capturing apparatus 200, and temporarily stores information needed by the image signal processor 220 or the controller 270 during an operation. The program storage unit 250 may store a program such as an operating system or an application system or the like that drives the image capturing apparatus 200.

The display unit 264 may display an operating state of the image capturing apparatus 100 or information about images captured by using the image capturing apparatus 200. The display driver 262 may provide a driving signal to the display unit 264.

The controller 270 may be configured to control the overall operation of the image capturing apparatus 200. The controller 270 may be configured to provide control signals to the elements of the image capturing apparatus 200 so as to control the elements of the image capturing apparatus 200.

The controller 270 may be configured to process an input image signal and control the elements of the image capturing apparatus 200 based on the processed image signal or an external input signal. The controller 270 may be one or more processors. The one or more processors may be implemented by an array of a plurality of logic gates, or may be implemented by a combination of a general-purpose microprocessor and a memory that stores a program executable in the general-purpose microprocessor. In addition, it will be apparent to a person of ordinary skill in the art that the one or more processors may be implemented using other types of hardware, and that the processors may include one or more cores.

The controller 270 may be configured to generate control signals for controlling auto-focusing, zoom adjustment, focus adjustment, automatic exposure compensation, and the like by executing a program stored in the program storage unit 250 or by using a separate module, and to provide the control signals to the aperture driver 215, the lens driver 212, and the image sensor controller 219, and to control the overall operations of the elements of the image capturing apparatus 200, such as a shutter and a stroboscope.

In addition, the controller 270 may be connected to an external monitor and be configured to control image signal processing so that an image signal input from the image signal processor 220 is displayed on the external monitor. The controller 270 may be configured to transmit image data obtained by the image signal processing to the external monitor so that an image corresponding to the image data is displayed on the external monitor.

The operation unit 280 may allow the user to input various control signals. The operation unit 280 may include various function buttons, such as a shutter-release button configured to input a shutter-release signal for capturing an image by exposing the image sensor 218 to light for a predetermined period of time, a power button configured to input a control signal for controlling a power on/off state of the image capturing apparatus 200, a zoom button configured to widen or narrow an angle of view based on an input, a mode selection button, and other buttons configured to adjust image capturing setting values. The operation unit 280 may also be implemented in any form, such as a button, a keyboard, a touch pad, a touch screen, or a remote controller, or the like, as long as the operation unit 280 allows the user to input control signals.

The communication unit 290 may include, for example, a network interface card (NIC), a modem or the like, and may allow the image capturing apparatus 200 to communicate with an external device via a network in a wired/wireless manner.

Figure 4:
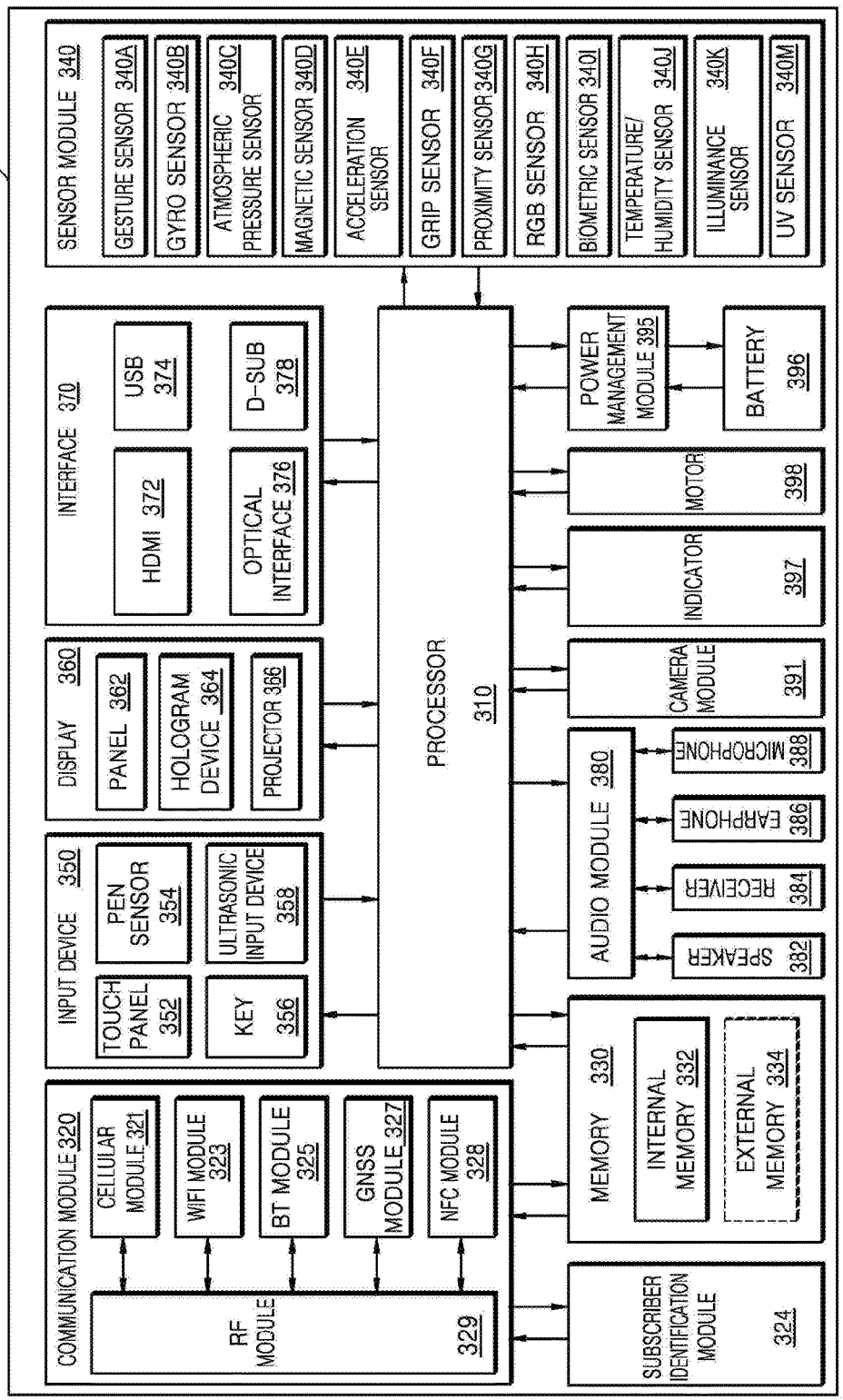
FIG. 4 is a block diagram illustrating an example structure of an image capturing apparatus.

FIG. 4 is a block diagram illustrating an example structure of an image capturing apparatus 300.

Referring to FIG. 4, the image capturing apparatus 300 may include at least one processor (e.g., an application processor (AP)) 310, a communication module (e.g., including communication circuitry) 320, a subscriber identification module 324, a memory 330, a sensor module (e.g., including at least one sensor) 340, an input device (e.g., including input circuitry) 350, a display (e.g., including a display panel and display driving circuitry) 360, an interface (e.g., including interface circuitry) 370, an audio module 380, a camera module 391, a power management module 395, a battery 396, an indicator 397, and a motor 398.

The processor 310 may be configured to control multiple hardware or software elements connected to the processor 310, by driving, for example, an operating system or an application program, and may perform various data processing and calculations. The processor 310 may be implemented, for example, as a system on chip (SoC). According to an example embodiment, the processor 310 may further include a graphic processing unit (GPU) and/or an image signal processor. The processor 310 may include at least some of the elements of other modules (e.g., a cellular module 321). The processor 310 may be configured to load a command or data received from at least one of the other elements (e.g., a non-volatile memory) to a volatile memory, and process the command or data, and store various data in the non-volatile memory.

The communication module 320 may include, for example, the cellular module 321, a Wi-Fi module 323, a Bluetooth module (BT) 325, a Global Navigation Satellite System (GNSS) module 327 (e.g., a GPS module, a GLONASS module, a BeiDou module, or a Galileo module), a Near Field Communication (NFC) module 328, and a radio frequency (RF) module 329.

The memory 330 may include, for example, an internal memory 332 or an external memory 334. The internal memory 332 may include, for example, at least one of a volatile memory (e.g., a dynamic RAM (DRAM), a static RAM (SRAM), or a synchronous dynamic RAM (SDRAM)), a non-volatile memory (e.g., a one time programmable ROM (OTPROM), a programmable ROM (PROM), an erasable and programmable ROM (EPROM), an electrically erasable and programmable ROM (EEPROM), a mask ROM, or a flash ROM), a flash memory (e.g., a NAND flash or a NOR flash), a hard drive, and a solid state drive (SSD), or the like.

The external memory 334 may further include a flash drive such as a compact flash (CF), a secure digital (SD), a micro secure digital (Micro-SD), a mini secure digital (Mini-SD), an extreme digital (xD), a multi-media card (MMC) or a memory stick, or the like. The external memory 334 may be functionally and/or physically connected to the image capturing apparatus 300 via various interfaces.

The sensor module 340 may, for example, measure a physical amount or detect an operating state of the image capturing apparatus 300, and convert measured or detected information into an electrical signal. The sensor module 340 may include at least one of, for example, a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, blue (RGB) sensor), a biometric sensor 340I, a temperature/humidity sensor 340J, an illuminance sensor 340K, and an ultra violet (UV) sensor 340M. The sensor module 340 may further include a control circuit to control at least one sensor included therein. In an example embodiment, the image capturing apparatus 300 may further include a processor configured as a portion of the processor 310 or as a separate element to control the sensor module 340, to thereby control the sensor module 340 while the processor 310 is in a sleep mode.

The input device 350 may include, for example, a touch panel 352, a (digital) pen sensor 354, a key 356, or an ultrasonic input device 358. The touch panel 352 may use, for example, at least one of an electrostatic method, a resistive method, an infrared method, and an ultrasonic method, or the like. In addition, the touch panel 352 may further include a control circuit. The touch panel 352 may further include a tactile layer so as to provide a tactile response to a user.

The (digital) pen sensor 354 may, for example, be a portion of a touch panel or include an additional recognition sheet. The key 356 may include, for example, a physical button, an optical key or a key pad. The ultrasonic input device 358 may detect an ultrasonic wave generated in an input device via a microphone (e.g., a microphone 388) and check data corresponding to the detected ultrasonic wave.

The display 360 may include a panel 362, a hologram device 364, or a projector 366. The panel 362 may be implemented, for example, as a flexible, transparent or wearable panel. The panel 362 may also be formed as a single module with the touch panel 352.

The interface 370 may include, for example, a high-definition multimedia interface (HDMI) 372, a universal serial bus (USB) 374, an optical interface 376, or a D-sub-miniature (D-sub) 378.

The audio module 380 may convert, for example, a sound into an electrical signal and vice versa. The audio module 380 may process sound information that is input or output via, for example, a speaker 382, a receiver 384, an earphone 386, or the microphone 388.

The camera module 391 captures, for example, a still image or video images. In an example embodiment, the camera module 391 may include at least one image sensor (e.g., a front sensor or a rear sensor), a lens, an image signal processor (ISP), or a flash (e.g., an LED or a xenon lamp).

The power management module 395 may, for example, manage power of the image capturing apparatus 300. According to an example embodiment, the power management module 395 may include a power management integrated circuit (PMIC), a charger integrated circuit (IC), or a battery or fuel gauge. The PMIC may use a wired and/or wireless charging method. The battery gauge may measure, for example, a remaining amount of charge in the battery 396 or a voltage, a current, or a temperature of the battery 396 during charging.

The indicator 397 may display a predetermined state of the image capturing apparatus 300 or an element thereof (e.g., the processor 310), such as a booting state, a message state, or a charging state thereof. The motor 398 may convert an electrical signal to a mechanical vibration, and generate vibration or haptic effects or the like.

Each of the elements described herein may be formed of one or more components, and the name of the elements may vary based on a type of an image capturing apparatus. In various example embodiments, an image capturing apparatus may include at least one of the elements described in the present disclosure, and some elements may be omitted therefrom or additional elements may be further included therein. Also, some of the elements of the image capturing apparatus according to the various example embodiments may be combined to form an entity and perform functions of the respective elements before they are combined with one another.

Figure 5A:
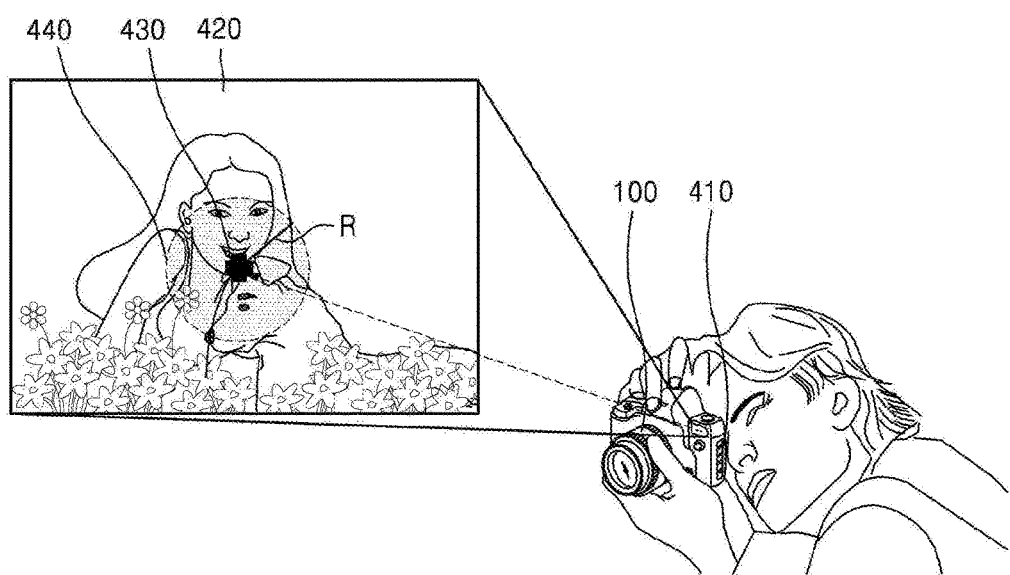
FIGS. 5A through 5B are diagrams illustrating an example method by which an image capturing apparatus sets a region of interest.
Figure 5B:
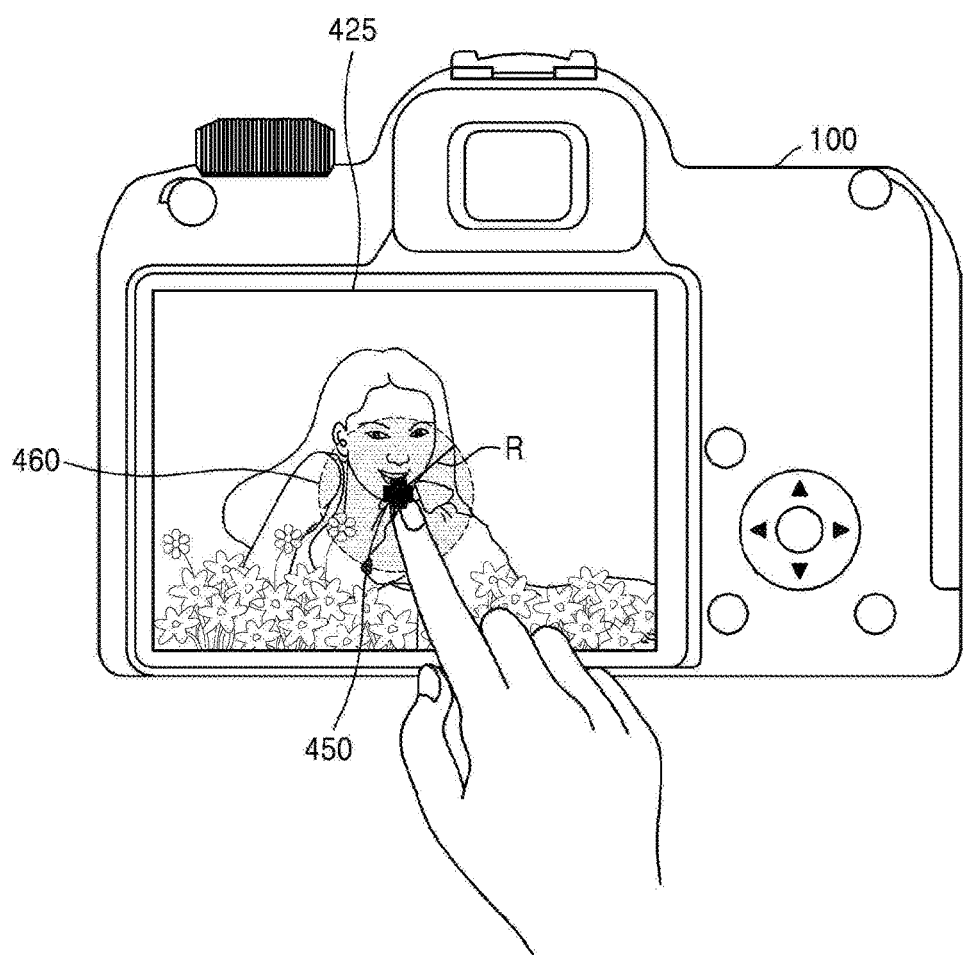

FIGS. 5A and 5B are diagrams to be referenced to illustrate an example method by which an image capturing apparatus 100 sets a region of interest.

Referring to FIG. 5A, the image capturing apparatus 100 may, for example, track a gaze of a user to set a region of interest.

The image capturing apparatus 100 according to an example embodiment may include a view finder 410. The view finder 410 may display a view finder image 420 to a user on a display unit included in the view finder 410 so that the user may check a composition and an image capturing condition of a subject whose image is to be captured. Also, the view finder 410 may include a gaze tracking camera capable of tracking a gaze of the user looking at the view finder image 420 displayed on the display unit.

The gaze tracking camera may capture an image of the eyes of the user, and a gaze of the user may be tracked using the image of the eyes of the user. The image capturing apparatus 100 may detect a point 430 where the tracked gaze of the user is maintained (a point at which the user is gazing) in the view finder image 420 displayed on the display unit, and may set a region of interest 440 having, for example, a preset size and shape with respect to the point 430. For example, the region of interest 440 may be a circle having the point 430 as a center and a radius R as illustrated in FIG. 5A. However, the shape of the region of interest 440 is not limited thereto.

Referring to FIG. 5B, the image capturing apparatus 100 may detect a touch input of a user to set a region of interest.

The image capturing apparatus 100 may include a touch screen. The touch screen may display a live view image 425 to a user so that the user may check a composition and an image capturing condition of a subject whose image is to be captured.

The image capturing apparatus 100 may detect a point 450 touched by the user, in the live view image 425 displayed on the touch screen, and may set a region of interest 460 having, for example, a preset size and shape with respect to the touched point 450. For example, the region of interest 460 may be, for example, a circle having the point 450 as a center and a radius R. However, the shape of the region of interest 460 is not limited thereto.

FIGS. 6, 7, 8A and 8B are diagrams to be referenced to illustrate an example method by which the image capturing apparatus 100 sets an AF region.

Figure 6:
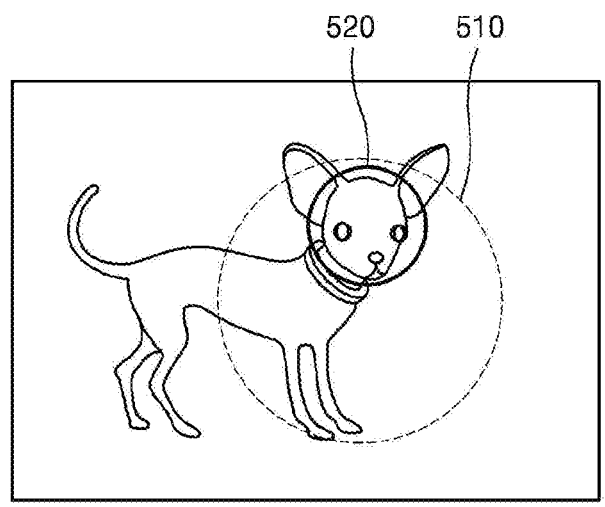
FIGS. 6, 7, 8A and 8B are diagrams illustrating an example method by which an image capturing apparatus sets an auto-focus region.

Referring to FIG. 6, when a region of interest 510 is set, the image capturing apparatus 100 may detect at least one candidate region from the region of interest 510. For example, the image capturing apparatus 100 may detect, from the region of interest 510, regions including a face of a person, a face of an animal, an object that is not a face of a person or a face of an animal, a line (or characteristics of a line), a point (or characteristics of a point), or the like, as candidate regions.

An algorithm for detecting a face of a person, an algorithm for detecting a face of an animal, an algorithm for detecting other objects, an algorithm for detecting a line or a point, or the like may be previously stored in the image capturing apparatus 100, and the image capturing apparatus 100 may detect candidate regions by using the stored algorithms.

As illustrated in FIG. 6, when one candidate region, here a first region 520, is detected as a candidate region from the region of interest 510, the image capturing apparatus 100 may set the first region 520 as an AF region.

Figure 7:
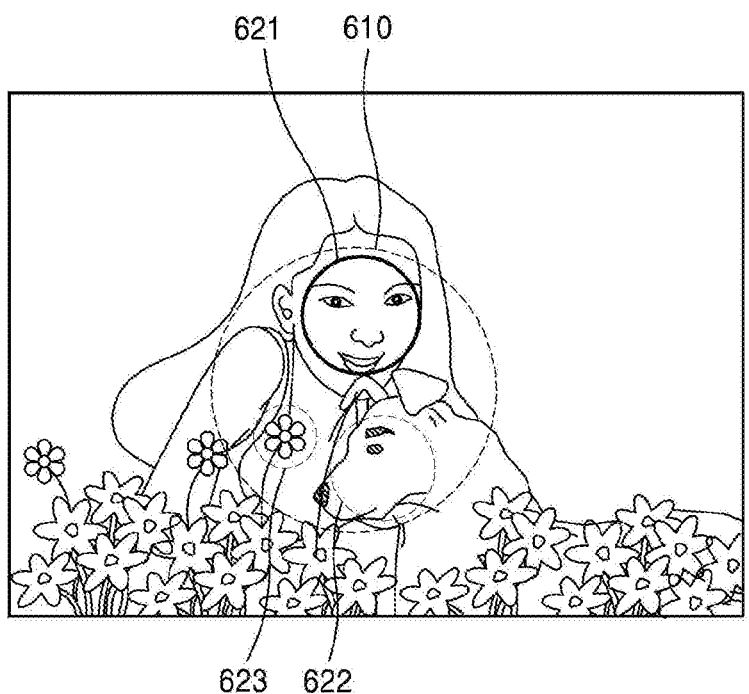

On the other hand, referring to FIG. 7, two or more candidate regions may be detected from a region of interest. For example, as illustrated in FIG. 7, the image capturing apparatus 100 may detect a first region 621, a second region 622, and a third region 633 from a region of interest 610. The first through third regions 621 through 623 may each have a priority. The priorities may be preset in the image capturing apparatus 100, and may be changed based on a user input.

In addition, a priority of a candidate region according to an example embodiment may be determined based on a type of an object included in the candidate region. For example, a candidate region including a face of a person may have a higher priority than a candidate region including a face of an animal. Alternatively, a candidate region including a face of an animal may be higher than a priority of a candidate region including an object that is not a face of a person or a face of an animal.

In FIG. 7, as the first region 621 is a region including a face of a person, the second region 622 is a region including a face of an animal, and the third region 623 is a region including an object that is not a face of a person or a face of an animal (for example, a plant), the image capturing apparatus 100 may set the first region 621 having the highest priority among the first through third regions 621 through 623 as an AF region.

Figure 8A:
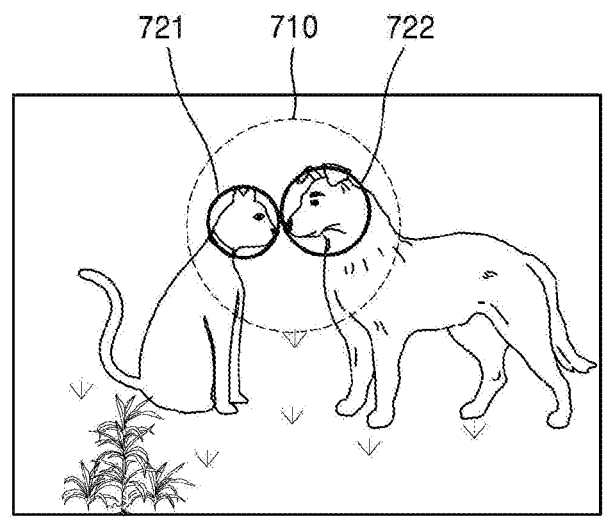

Referring to FIG. 8A, candidate regions detected from a region of interest 710 may have the same priority. For example, the image capturing apparatus 100 may detect a first region 721 and a second region 722 from the region of interest 710 as candidate regions. The first region 721 may be a region including a face of a cat, and the second region 722 may be a region including a face of a puppy. Both the first region 721 and the second region 722 include a face of an animal and may have the same priority.

When there are two or more candidate regions having the highest priority, the image capturing apparatus 100 according to an example embodiment may analyze a path of an AF region in frames of previous points of time, and set a candidate region that is closest to the analyzed path, as an AF region. This will be described in greater detail below with reference to FIG. 8B.

Figure 8B:
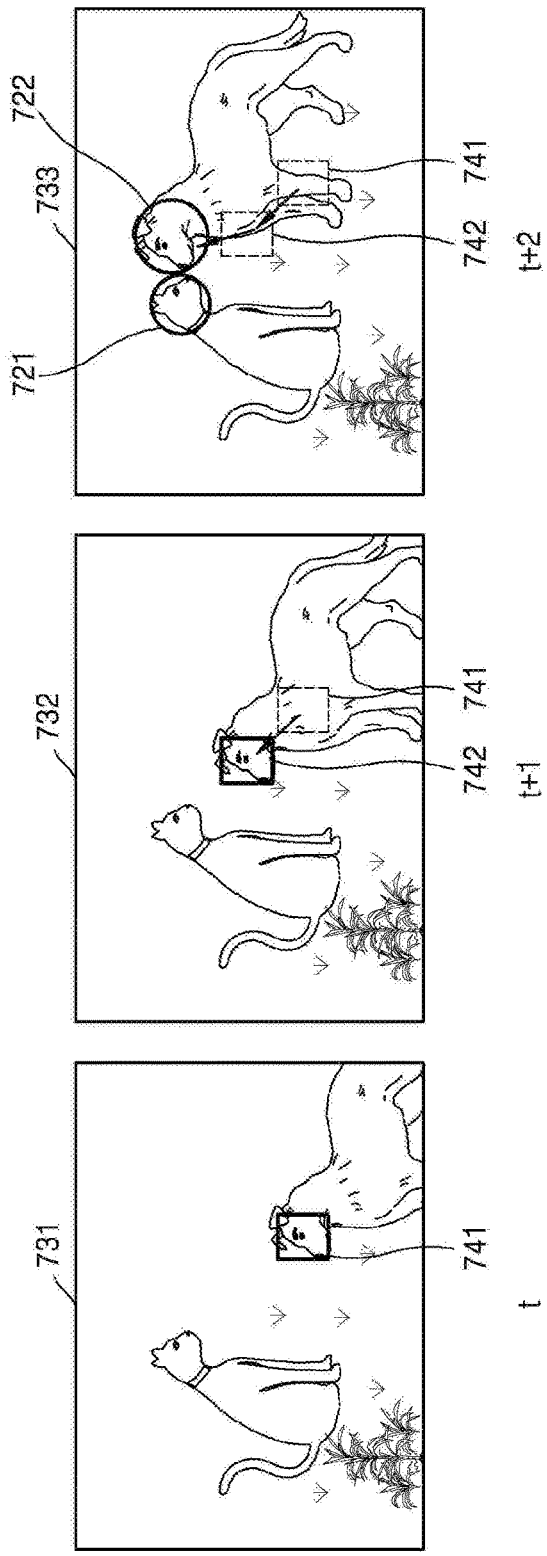

Referring to FIG. 8B, assuming that a present time is t+2, the image capturing apparatus 100 may analyze a path that an AF region moved along, by detecting an AF region 741 at a time t in a frame 731 and an AF region 742 from a frame 732 at a time t+1. The image capturing apparatus 100 may set, from among the first region 721 and the second region 722, the second region 722 that is relatively closer to a path between the AF regions 741 and 742, which are previous AF regions, as an AF region.

Alternatively, when there are two or more candidate regions having the highest priority, the image capturing apparatus 100 may set a candidate region that is closer to AF regions in frames of previous points in time, as an AF region. For example, the image capturing apparatus 100 may set the second region 722 that is closer to the AF region 741 in the frame 731 at the time t and to the AF region 742 in the frame 732 at the time t+1 than the first region 721, as an AF region.

Figure 9A:
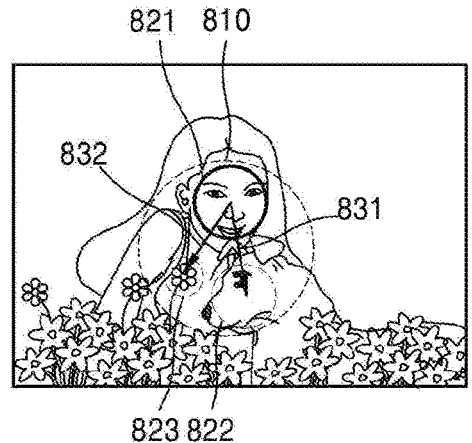
FIG. 9A through 9C are diagrams illustrating an example method by which an image capturing apparatus resets an auto-focus region.
Figure 9B:
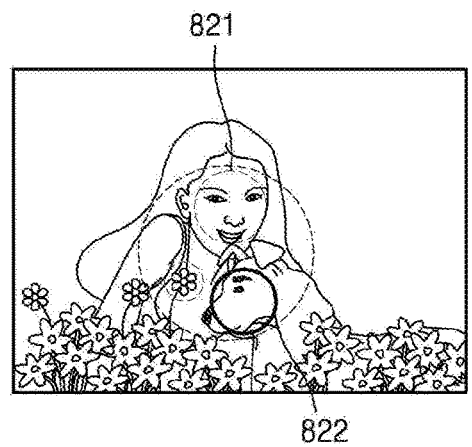
Figure 9C:
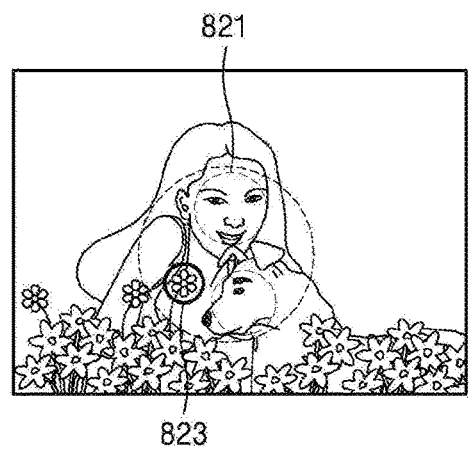

FIG. 9A through 9C are diagrams to be referenced to illustrate an example method by which an image capturing apparatus resets an AF region.

Referring to FIG. 9A, the image capturing apparatus 100 may detect a first region 821, a second region 822, and a third region 823 from a region of interest 810 as candidate regions. The image capturing apparatus 100 may set, from among the first region 821, the second region 822, and the third region 823, the first region having a highest priority as an AF region. However, the first region 821 set as the AF region may not be an AF region desired by the user. In this example, the image capturing apparatus 100 may reset a new AF region based on a user input.

The image capturing apparatus 100 according to an example embodiment may receive a user input for designating a direction of an AF region to be reset with respect to a present AF region. For example, while the first region 821 is set as the present AF region, if the second region 822 is to be set as a new AF region, the user may move his/her gaze from the first region 821 to the second region 822 in a first direction 831 (right downward direction) a predetermined number of times. When an input of moving the user's gaze in the first direction 831 (right downward direction) a predetermined number of times or more is detected, the image capturing apparatus 100 may set a candidate region located in the detected movement direction (the first direction 831) (the second region 822) as a new AF region as illustrated in FIG. 9B.

In addition, while the first region 821 is set as the present AF region, if the third region 823 is to be set as a new AF region, the user may move his/her gaze from the first region 821 to the third region 823 in a second direction 832 (left downward direction) a predetermined number of times or more. When an input of moving the user's gaze in the second direction 832 (left downward direction) a predetermined number of times or more is detected, the image capturing apparatus 100 may set a candidate region located in the detected movement direction (the second direction 832) (the third region 823) as a new AF region as illustrated in FIG. 9C.

Alternatively, the user may move an AF region from the first region 821 to the second region 822 or from the first region 821 to the third region 823 by using a four-direction key included in the operation unit 280. This will be described greater detail below with reference to FIGS. 10A and 10B.

Figure 10A:
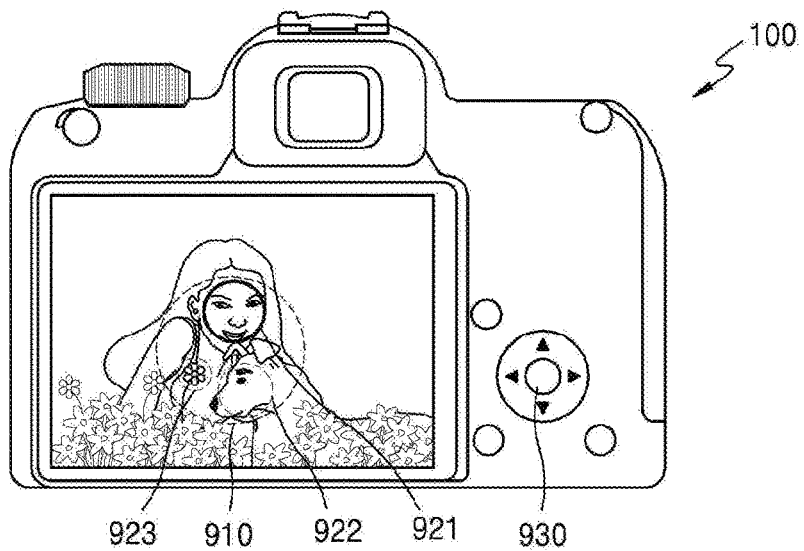
FIGS. 10A and 10B are diagrams illustrating an example method by which an image capturing apparatus resets an auto-focus region.
Figure 10B:
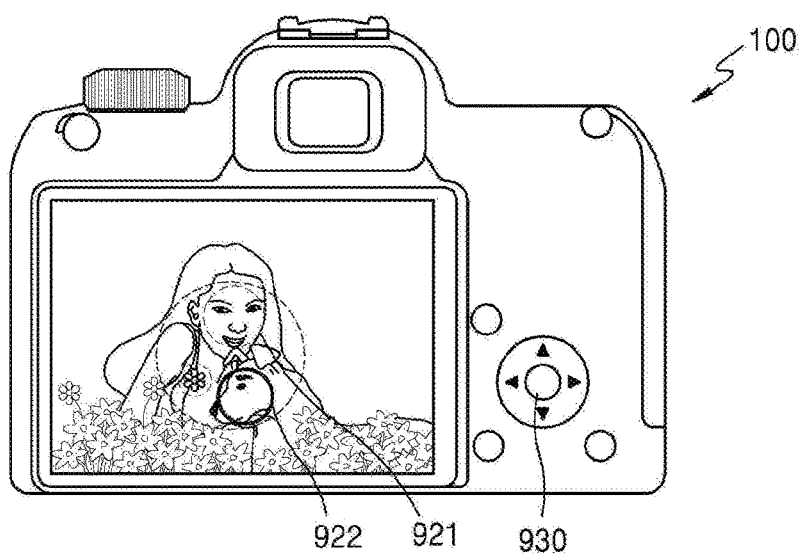

FIGS. 10A and 10B are diagrams to be referenced to illustrate an example method by which an image capturing apparatus resets an AF region.

When a direction key input for designating a direction of an AF region to be reset with respect to a present AF region is detected, the image capturing apparatus 100 according to an example embodiment may reset a candidate region located in the detected direction as a new AF region.

Referring to FIG. 10A, the image capturing apparatus 100 may detect a first region 921, a second region 922, and a third region 923 from a region of interest 910 as candidate regions. The image capturing apparatus 100 may set the first region 921 which has a highest priority from among the first region 921, the second region 922, and the third region 923, as an AF region.

If the first region 921 is not an AF region desired by the user, the user may press a direction key of the four-direction key 930 indicating a direction of an AF region to be reset with respect to the present AF region. The image capturing apparatus 100 may detect a direction key input of the user to reset a candidate region located in a detected direction as a new AF region.

For example, while the first region 921 is set as the present AF region, if the second region 922 is to be set as a new AF region, the user may press a right direction key and a downward direction key of the four-direction key 930. By detecting the right direction key input and the downward direction key input, the image capturing apparatus 100 may reset the second region 922 located in a right downward direction as a new AF region as illustrated in FIG. 10B.

Figure 11:
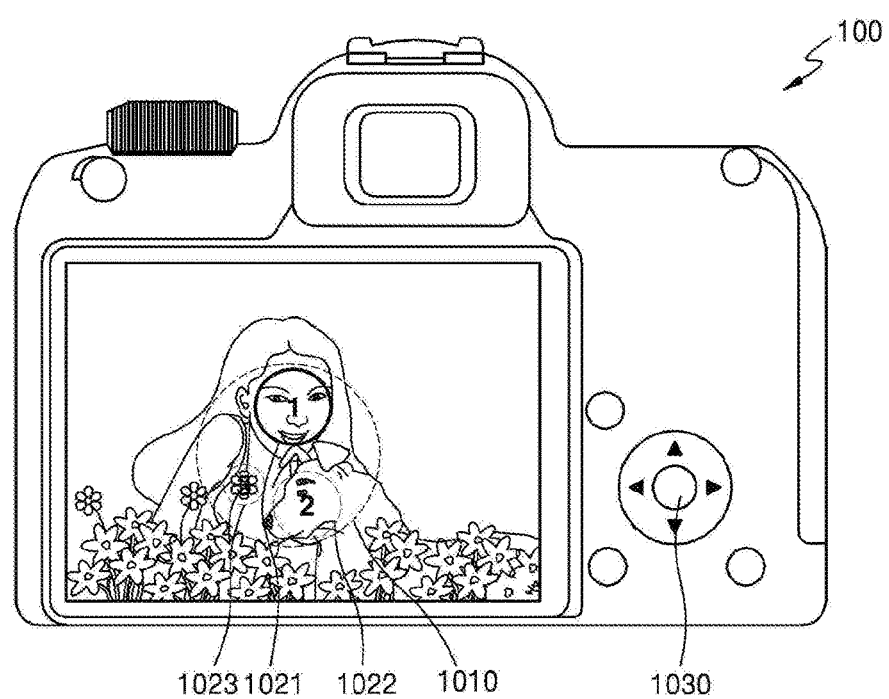
FIG. 11 is a diagram illustrating an example method by which an image capturing apparatus sets an auto-focus region.

FIG. 11 is a diagram to be referenced to illustrate an example method by which an image capturing apparatus sets an AF region.

Referring to FIG. 11, the image capturing apparatus 100 according to an example embodiment may display candidate regions detected from a region of interest and priorities of the candidate regions on the display unit 130.

For example, the image capturing apparatus 100 may detect a first region 1021, a second region 1022, and a third region 1023 as candidate regions from a region of interest 1010. From among the detected candidate regions (the first region 1021, the second region 1022, and the third region 1023), the first region 1021 including a face of a person may have a higher priority than the second region 1022 including a face of an animal and the third region 1023 including an object that is not a face of a person or an animal (e.g., a flower), the second region 1022 may have a higher priority than the third region 1023, and the third region 1023 may have a lowest priority.

The image capturing apparatus 100 may display the first region 1021, the second region 1022, and the third region 1023 and respective priorities thereof on the display unit 130. The priorities may be displayed by numbers. For example, the number '1' may be displayed on the first region 1021 having the highest priority, and the number '2' may be displayed on the second region 1022 having a next-highest priority to the first region 1021, and the number '3' may be displayed on the third region 1023 having a next-highest priority to the second region 1022.

Meanwhile, the image capturing apparatus 100 may set the first region 1021 having the highest priority among the candidate regions as an AF region. Alternatively, the image capturing apparatus 100 may set as an AF region a candidate region that is selected based on a user input for selecting one of displayed candidate regions (e.g., an input touching one of the candidate regions).

While the first region 1021 is set as the present AF region, when an input of a four-direction key 1030 is detected, the image capturing apparatus 100 may reset another candidate region as a new AF region. For example, while the first region 1021 is set as the present AF region, when an input of pressing a right direction key of the four-direction key 1030 is detected, the image capturing apparatus 100 may reset the second region 1022 having a next-highest priority to the first region 1021 as a new AF region. Also, while the second region 1022 is set as the present AF region, when an input of pressing a right direction key of the four-direction key 1030 is detected, the image capturing apparatus 100 may reset the third region 1023 having a next-highest priority to the second region 1022 as a new AF region.

On the other hand, while the third region 1023 is set as the present AF region, when an input of pressing a left direction key of the four-direction key 1030 is detected, the image capturing apparatus 100 may reset the second region 1022 having a next-lowest priority to the third region 1023 as a new AF region. Also, while the second region 1022 is set as the present AF region, when an input of pressing a left direction key of the four-direction key 1030 is detected, the image capturing apparatus 100 may reset the first region 1021 having a next-lowest priority to the second region 1022 as a new AF region.

While an input of pressing a right direction key and a left direction key has been described with reference to FIG. 11, an AF region may also be reset via an input of pressing an upward direction key or a downward direction key.

Figure 12A:
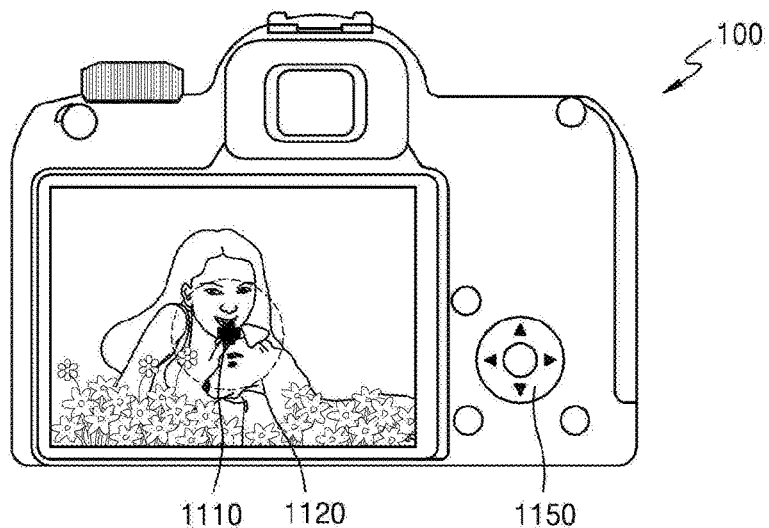
FIGS. 12A and 12B are diagrams illustrating an example method of setting a size and shape of a region of interest.
Figure 12B:
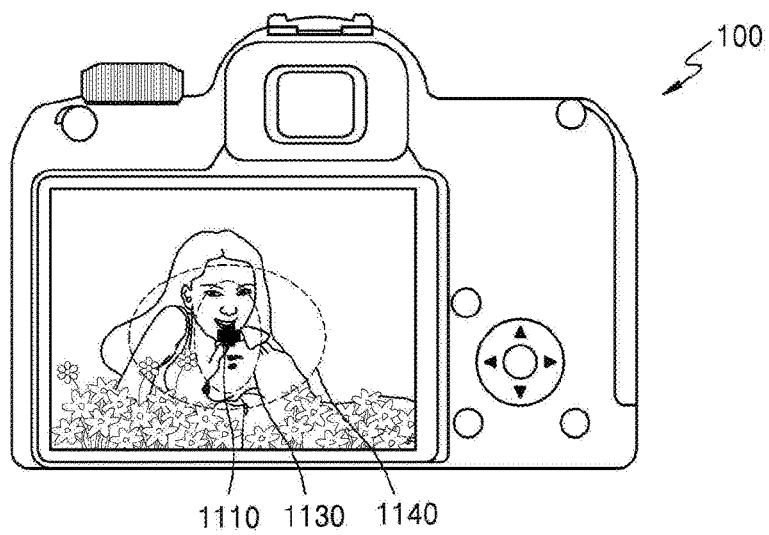

FIGS. 12A and 12B are diagrams to be referenced to illustrate an example method of setting a size and shape of a region of interest.

Referring to FIGS. 12A and 12B, the image capturing apparatus 100 may change a size and shape of a region of interest based on a user input.

After having entered a menu for setting a region of interest, a user may change a size and shape of a region of interest using, for example, a four-direction key 1150. For example, when horizontally expanding a size of a region of interest 1120 that is currently set, with respect to a central point 1110, the user may press a right direction key. When the right direction key input is detected, the image capturing apparatus 100 may horizontally expand a size of the region of interest 1120 to display a region of interest 1140 having a changed size and shape as illustrated in FIG. 12B.

On the other hand, when contracting the size of the currently set region of interest 1120 in a horizontal direction with respect to the central point 1110, the user may press a left direction key. When the left direction key input is detected, the image capturing apparatus 100 may contract the size of the region of interest 1120 as illustrated in FIG. 12B to display a region of interest 1130 having a changed size and shape.

Also, although not illustrated, when an upward direction key input is detected, the image capturing apparatus 100 may vertically expand a size of a region of interest, and when a downward direction key input is detected, the image capturing apparatus 100 may vertically contract a size of a region of interest.

As the method described with reference to FIG. 12 is merely an example embodiment, the present disclosure is not limited thereto, and the image capturing apparatus 100 may change a size and shape of a region of interest by detecting various user inputs.

Figure 13:
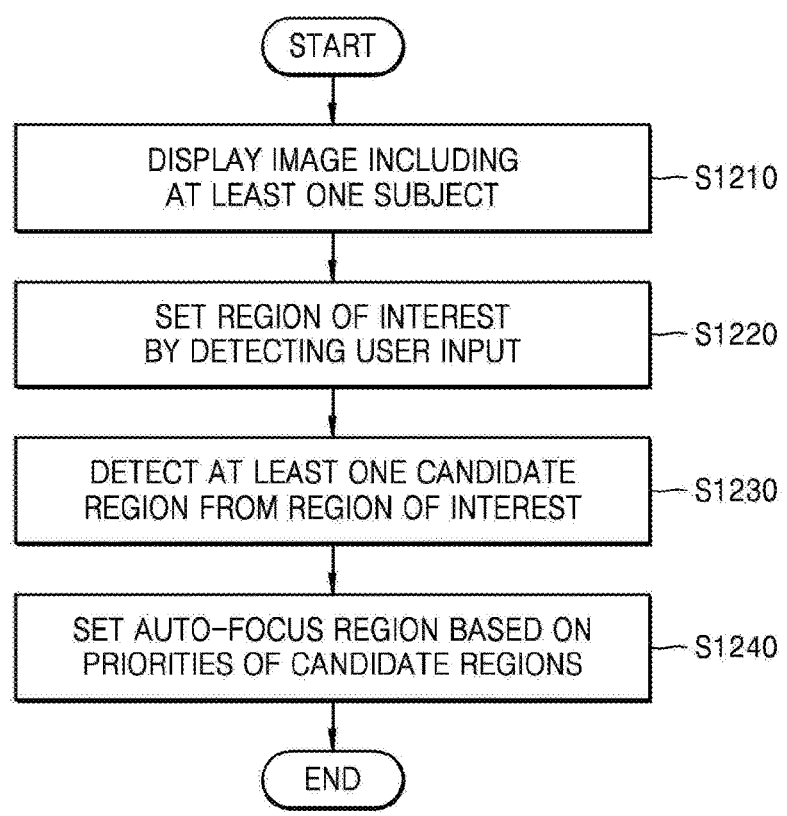
FIG. 13 is a flowchart illustrating an example method of operating an image capturing apparatus.

FIG. 13 is a flowchart illustrating an example method of operating an image capturing apparatus.

Referring to FIG. 13, the image capturing apparatus 100 may display an image including at least one subject on a display unit in operation S1210.

For example, the image capturing apparatus 100 may display, on the display unit, a live view image or a view finder image to a user so that the user may check a composition and an image capturing condition of a subject whose image is to be captured.

The image capturing apparatus 100 may set a region of interest by detecting a user input of setting a region of interest in operation S1220.

For example, the image capturing apparatus 100 may detect a point where a gaze of the user is maintained (a point at which the user is gazing) in an image displayed on the display unit (e.g., a live view image or a view finder image), and may set a region of interest having a preset size and a preset shape with respect to the detected point. Alternatively, the image capturing apparatus 100 may detect a point touched by the user within a live view image displayed on a touch screen and set a region of interest with respect to the detected point.

The image capturing apparatus 100 may detect at least one candidate region from the set region of interest in operation S1230.

For example, the image capturing apparatus 100 may detect, from a set region of interest, predetermined regions including, for example, a face of a person, a face of an animal, an object that is not a person or an animal, a line (or characteristics of a line), a point (or characteristics of a point), or the like.

An algorithm for detecting a face of a person, an algorithm for detecting a face of an animal, an algorithm for detecting other objects, an algorithm for detecting a line or a point may be previously stored in the image capturing apparatus 100, and the image capturing apparatus 100 may detect candidate regions by using the stored algorithms.

The image capturing apparatus 100 may set one of detected candidate regions as an AF region based on priorities of the candidate regions in operation S1240.

For example, when one candidate region is included in a region of interest, the image capturing apparatus 100 may set the candidate region as an AF region. Alternatively, when two or more candidate regions are included in a region of interest, the image capturing apparatus 100 may set a candidate region having a highest priority as an AF region based on priorities of the candidate regions. Here, a priority of a candidate region may be determined based on a type of an object included in the candidate region. For example, a priority of a candidate region including a face of a person may be higher than a priority of a candidate region including a face of an animal. Alternatively, a priority of a candidate region including a face of an animal may be higher than a priority of a candidate region including an object that is not a face of a person or a face of an animal. However, the priorities of candidate regions are not limited thereto.

Also, the image capturing apparatus 100 may display the set AF region on the display unit, and drive a focus lens to focus on the set AF region.

The method of operating an image forming apparatus according to the example embodiments set forth herein may be embodied as program instructions that can be executed by various computing units and recorded on a non-transitory computer-readable recording medium. Examples of the non-transitory computer-readable recording medium may include program instructions, data files, and data structures solely or in combination. The program instructions recorded on the non-transitory computer-readable recording medium may be specifically designed and configured for the disclosure, or may be well known to and usable by one of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a read only memory (ROM), a random access memory (RAM), a flash memory, etc.). Examples of the program instructions may include not only machine language codes prepared by a compiler but also high-level codes executable by a computer by using an interpreter.

According to one or more example embodiments, a region of a face or an object is detected within a region of a predetermined range set based on a user input, and one of detected regions is set as an AF region, so as to accurately perform auto-focusing on a region the user desires to be focused, and increase usage convenience for the user.

In addition, auto-focusing may also be accurately performed on moving objects, and if a wrong AF region is set, a new AF region may be reset based on a user input.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An image capturing apparatus comprising:
  a display unit comprising a display panel, the display unit configured to display an image including at least one subject;
  a detection unit comprising detection circuitry, the detection unit configured to detect an input for setting a part of the displayed image as a region of interest; and
  a controller configured to:
    automatically detect at least one candidate region within the region of interest; and
    set one of the at least one detected candidate region as an auto-focus (AF) region, based on priorities of the at least one detected candidate region,
  wherein the controller is further configured to:
    upon identifying two or more detected candidate regions comprising same priorities, set one of the detected candidate regions as the AF region, based on the priorities of the detected candidate regions and based on which candidate region is closest to a path of AF regions set in previous frames for the image.

2. The image capturing apparatus of claim 1, wherein the detection unit is configured to track a gaze of a user looking at the display unit, and
  the controller is configured to set the region of interest based on a point on the display unit that is intersected by the tracked gaze of the user.

3. The image capturing apparatus of claim 1, wherein the detection unit is configured to detect a touch input of touching the display unit, and
  the controller is configured to set the region of interest with respect to a touched point on the display unit.

4. The image capturing apparatus of claim 1, wherein the controller is configured to set at least one of a size and a shape of the region of interest based on an input for setting at least one of the size and the shape of the region of interest.

5. The image capturing apparatus of claim 1, wherein the priorities of the at least one detected candidate region are determined based on types of objects included in the at least one detected candidate region, and wherein the types of objects include one or more of a face of a person, a face of an animal, an object that is not a person or an animal, a line, and a point.

6. The image capturing apparatus of claim 1, wherein, when one candidate region is detected from the region of interest, the controller is configured to set the one candidate region as the AF region.

7. The image capturing apparatus of claim 1, wherein when the plurality of the candidate regions is detected within the region of interest, the controller is configured to set one of the plurality of candidate regions having a highest priority from among the detected plurality of candidate regions as the AF region.

8. The image capturing apparatus of claim 1, wherein the detection unit is configured to detect an input of a gaze moving while the AF region is set, and
  the controller is configured to reset a candidate region located in a direction in which the gaze moves with respect to the set AF region, as a new AF region.

9. The image capturing apparatus of claim 1, wherein the display unit is configured to display the at least one detected candidate region, and the controller is configured to set one of the at least one detected candidate region as the AF region selected based on an input for selecting the one of the at least one detected candidate region.

10. The image capturing apparatus of claim 1, wherein the display unit is configured to display the set AF region.

11. A method of operating an image capturing apparatus, the method comprising:
  displaying an image including at least one subject;
  setting a part of the displayed image as a region of interest by detecting an input for setting a region of interest in the displayed image;
  automatically detecting at least one candidate region within the set region of interest; and
  setting one of the at least one detected candidate regions as an auto-focus (AF) region, based on priorities of the at least one detected candidate region,
  wherein, the setting of the AF region further comprises:
    upon identifying two or more detected candidate regions comprising same priorities, setting one of the detected candidate regions as the AF region, based on the priorities of the detected candidate regions and based on which candidate region is closest to a path of AF regions set in previous frames for the image.

12. The method of claim 11, wherein the setting of the region of interest by detecting the input comprises tracking a gaze via a display unit, and setting the region of interest with respect to a point on the display unit that is intersected by the tracked gaze.

13. The method of claim 11, wherein the setting of the region of interest by detecting the input comprises detecting a touch input of touching a display unit and setting the region of interest with respect to a touched point on the display unit.

14. The method of claim 11, further comprising setting at least one of a size and a shape of the region of interest based on an input for setting at least one of the size and the shape of the region of interest.

15. The method of claim 11, wherein the priorities of the at least one detected candidate region are determined based on types of objects included in the at least one detected candidate region, and wherein the types of objects include one or more of a face of a person, a face of an animal, an object that is not a person or an animal, a line, and a point.

16. The method of claim 11, wherein the setting of one of the at least one detected candidate region as the AF region comprises, when one candidate region is detected from the region of interest, setting the one candidate region as the AF region.

17. The method of claim 11, wherein the setting of the one of the at least one detected candidate region as the AF region comprises, when a plurality of the candidate regions is detected within the region of interest, setting the one of the plurality of the candidate regions having a highest priority from among the plurality of the candidate regions as the AF region.

18. The method of claim 11, further comprising:
detecting an input of a moving gaze while the AF region is set; and
resetting a candidate region located in a direction in which the gaze moves with respect to the set AF region, as a new AF region.

19. The method of claim 11, further comprising:
displaying the at least one detected candidate region; and
detecting an input for selecting one of the at least one detected candidate region, wherein the setting of one of the at least one detected candidate region as an AF region comprises setting the selected candidate region as the AF region.

20. A non-transitory computer-readable recording medium having recorded thereon a program which, when executed, causes a computer of an image capturing apparatus to control the image capturing apparatus to perform at least:
displaying an image including at least one subject;
setting a part of the displayed image as a region of interest by detecting an input for setting a region of interest in the displayed image;
automatically detecting at least one candidate region within the set region of interest; and
setting one of the at least one detected candidate regions as an auto-focus (AF) region, based on priorities of the at least one detected candidate region,
wherein the setting of the AF region further comprises:
upon identifying two or more detected candidate regions comprising same priorities, setting one of the detected candidate regions as the AF region, based on the priorities of the detected candidate regions and based on which candidate region is closest to a path of AF regions set in previous frames for the image.

* * * * *